US006007788A

United States Patent [19]

Bellon et al.

[11] Patent Number: 6,007,788

[45] Date of Patent: Dec. 28, 1999

[54] INJECTION MOLDED CONTAINER FOR DETERGENTS

[75] Inventors: Tiziano Joseph Bellon, Northville, Mich.; James Wesley Livingston, Santa Cruz, Calif.; Patricia Anne Anderson, Mason, Ohio; Donald Wright, Mississauga, Canada; Charles Alan Messamer, San Jose; Clifford Francis Mc Namara, Capitola, both of Calif.

[73] Assignee: DiverseyLever, Inc., Plymouth, Mich.

[21] Appl. No.: 08/953,617

[22] Filed: Oct. 17, 1997

[51] Int. Cl.[6] .......... B01D 11/02

[52] U.S. Cl. .......... 422/264; 422/266; 422/279; 68/17 R

[58] Field of Search .......... 422/264, 266, 422/278, 279; 137/268; 68/17 R

[56] References Cited

U.S. PATENT DOCUMENTS

| | | | |
|---|---|---|---|
| 2,738,323 | 3/1956 | Tepas | 422/274 |
| 3,383,178 | 5/1968 | Dietz | 422/278 |
| 3,416,897 | 12/1968 | Long et al. | 422/264 |
| 3,595,438 | 7/1971 | Daley et al. | 422/274 X |
| 4,199,001 | 4/1980 | Kratz | 422/264 X |
| 4,250,911 | 2/1981 | Kratz | 422/264 X |
| 4,462,511 | 7/1984 | Fulmer | 422/261 X |
| 4,666,782 | 5/1987 | Mayer et al. | 428/423.9 |
| 4,790,981 | 12/1988 | Mayer | 422/263 |
| 4,928,240 | 5/1990 | Lakhan | 701/100 |
| 4,964,185 | 10/1990 | Lehn | 8/158 |
| 5,007,559 | 4/1991 | Young | 422/266 X |
| 5,076,315 | 12/1991 | King | 422/264 X |
| 5,078,301 | 1/1992 | Gladfelter | 222/52 |
| 5,086,952 | 2/1992 | Kryk | 422/264 |
| 5,147,615 | 9/1992 | Bird | 422/261 |
| 5,229,084 | 7/1993 | Livingston | 422/278 |
| 5,234,615 | 8/1993 | Gladfelter | 510/439 |
| 5,251,656 | 10/1993 | Sexton | 422/264 X |
| 5,262,132 | 11/1993 | Bricker | 422/263 |
| 5,759,501 | 6/1998 | Livingston et al. | 422/266 X |

FOREIGN PATENT DOCUMENTS

| | | |
|---|---|---|
| 44 14 956 | of 0000 | Germany . |
| 96/41565 | of 0000 | WIPO . |

*Primary Examiner*—Elizabeth McKane

[57] ABSTRACT

A container for dispensing detergent for an automatic washing apparatus includes a straight, inwardly tapered side wall which has an open top and a bottom portion. The bottom portion includes an integral screen which includes a water inlet. Detergent is placed in the container and snap-on covers are positioned over the top and bottom of the container. To dispense detergent from the container, the bottom cover is removed and the container placed in a dispensing unit which sprays water through the bottom. Dissolved detergent is collected and flows to the washing apparatus. The container is easy to manufacture, easy to fill, easy to ship and use.

10 Claims, 4 Drawing Sheets

INJECTION MOLDED CONTAINER FOR DETERGENTS

BACKGROUND OF THE INVENTION

Special chemical dispensers are employed for institutional washing apparatuses such as ware-washing machines. Automatic detergent dispensers utilize detergent in special packaging. There are several goals that must be achieved in packaging such detergent. The first is the effective, safe distribution of the detergent. In association with the effective distribution of the detergent, the dispensing rate of the detergent must be uniform. Solid detergents, i.e., powders, tablets, granules and bricks, are generally preferred since they are more concentrated and reduce the overall size of the container. The package must permit all of the detergent to be dispensed.

Further, the overall cost of the container and the process of packaging the detergent in the container is very significant. The cost of the detergent will generally include the detergent composition itself, the detergent container, and any processing required to package the detergent and subsequently use the detergent. Thus, the container should be designed in a way to reduce these costs, as well as the cost of the dispenser. Generally, these are single-use containers which are discarded after use.

A further goal is simplification. The detergent container and dispensing system should be as simple to use as possible. Further, it is desirable to make the overall packaging system as simple and inexpensive as possible without affecting safety.

There are many different containers currently designed for solid commercial detergents. These can range from rigid plastic pans which hold solid bricks of detergent to flexible plastic bags which hold powdered detergent or pelleted detergent. One such container is disclosed in pending application Ser. No. 08/749,834, filed Nov. 15, 1996. This system employs a container which holds detergent. Water is sprayed on the detergent dissolving it. The dissolved detergent is then fed to the washing apparatus. This application discloses a flexible-walled container which has a rigid injection-molded plastic screen. This is a relatively simple container. However, it has some limitations. Because it is formed from a flexible-walled material, i.e., a plastic film, it is difficult to fill. It is also not compatible with powdered detergent. Further, the plastic film must be formed into a bag and adhered to the rigid plastic screen. This, again, increases costs. Due to the shape of the plastic bag that is attached to the plastic screen, the quantity of detergent which can be held by such a container is reduced. This also requires a special insert to align the container in the dispensing unit.

Other rigid containers are disclosed in, for example, Bird U.S. Pat. No. 5,147,615 and Young U.S. Pat. No. 5,007,559. These are filled through an opening, and then the opening is capped with a screen. This makes filling difficult. Also, these containers generally have shoulders which can interfere with complete dissolution of all detergent within the container.

SUMMARY OF THE INVENTION

Accordingly, it is an object of the present invention to provide a simple container for powder detergents. Further, it is an object of the present invention to provide such a container which can be easily manufactured, filled and distributed and, very importantly, which will provide a safe, easy method of dispensing the detergent composition.

The objects and advantages of the present invention are premised upon the realization that a plastic container having an integrally formed bottom screen and an open top can be easily filled with a solid detergent formulation (i.e., powdered, pelleted or granular) and subsequently sealed with a snap-on lid. The bottom screen can, in turn, be covered with a snap-on lid which provides for safe, easy transportation of the detergent. The detergent is dispensed by simply pulling off the bottom lid and placing the container into a dispenser. Preferably, the side walls of the dispenser are tapered slightly inwardly, extending to the bottom screen without any shoulders, providing for effective utilization of all the detergent within the container. Further, this configuration in effect centers the detergent in the dispenser unit.

The objects and advantages of the present invention will be further appreciated in light of the following detailed description and drawings in which:

DETAILED DESCRIPTION

Figure 1:
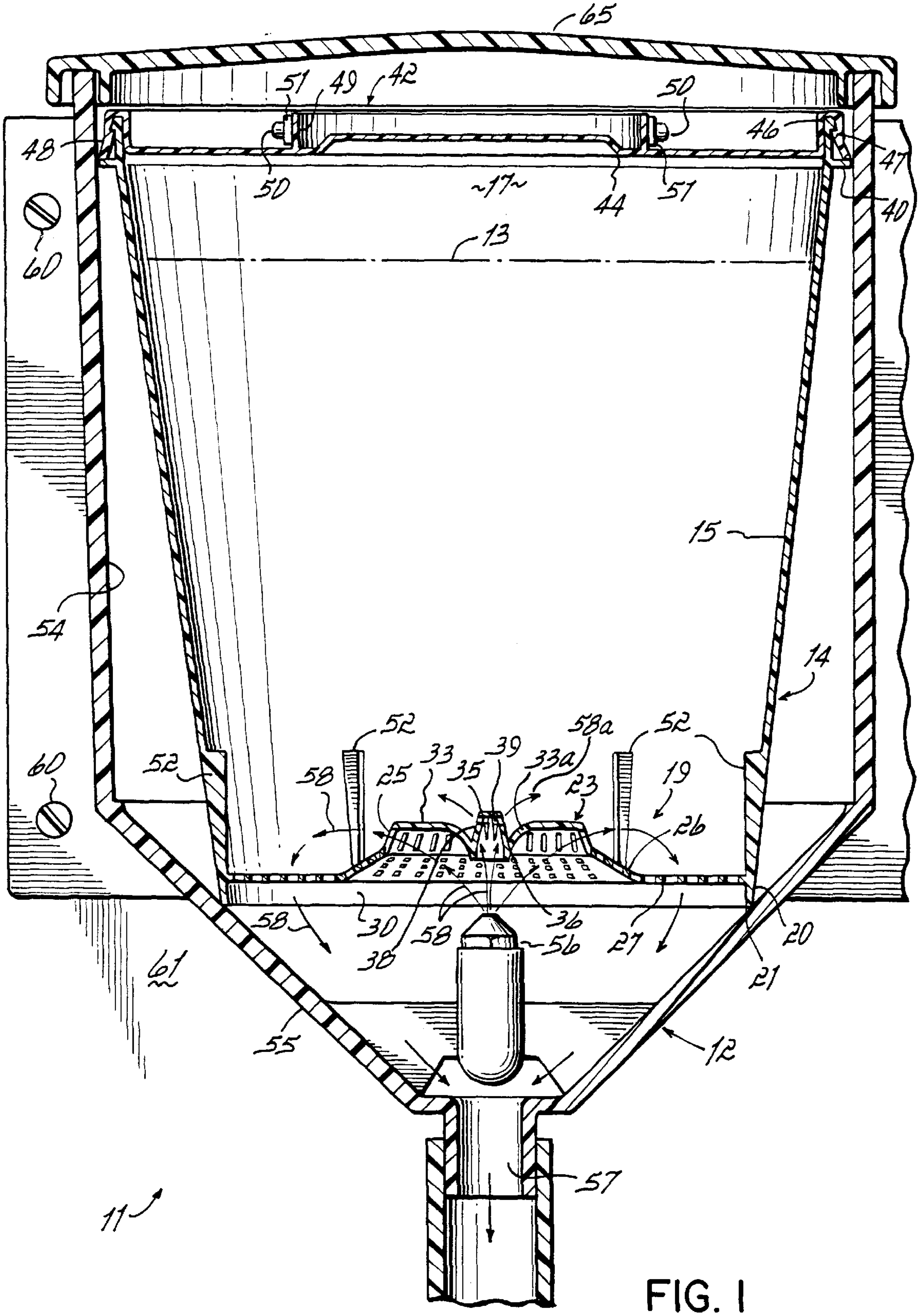
FIG. 1 is a cross-sectional view of the container of the present invention in a dispensing unit.

As shown in FIG. 1, there is a commercial detergent-dispensing apparatus 11 which includes a dispensing unit 12 holding a detergent container 14 filled with detergent 13. The detergent 13 can be powdered, granular or tableted. The detergent container 14 includes a tapered, circular sidewall 15, a top 17 and a screened bottom portion 19. The tapered sidewall 15 extends below the screened bottom portion 19 and includes annular rim 20 and terminates at bottom edge 21.

Figure 6:
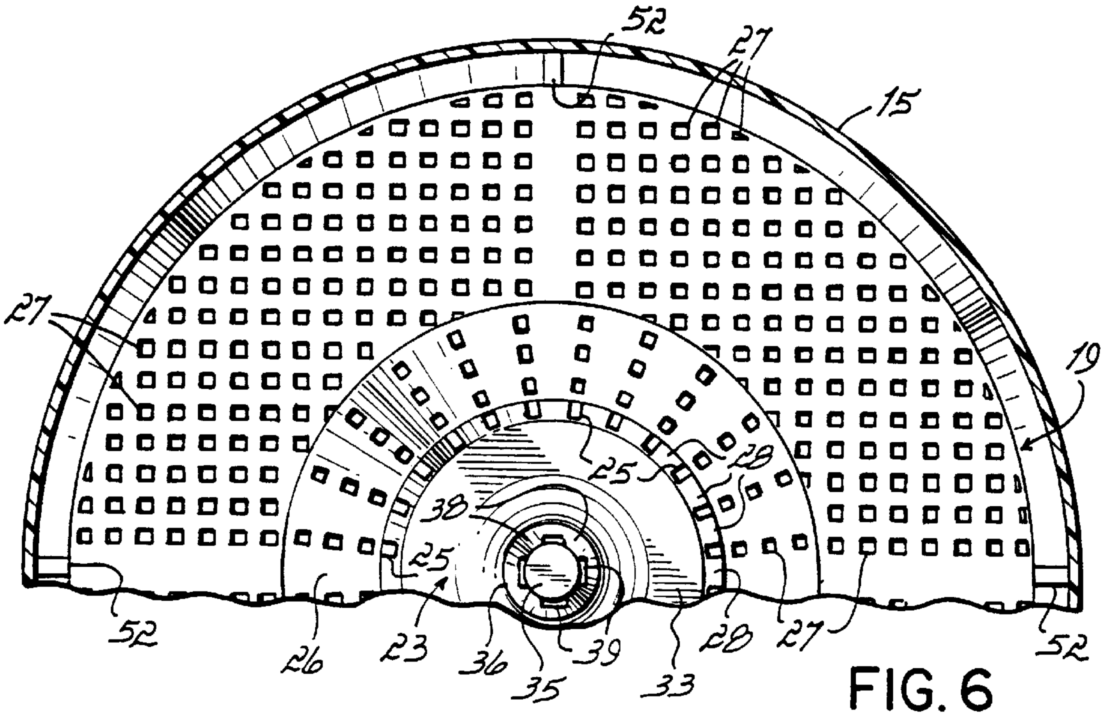
FIG. 6 is a cross-sectional view taken at lines 6—6 of FIG. 5 of the present invention.

As shown in FIG. 6, the bottom 19, which is preferably integrally molded within the container 14, includes a central portion 23 and an annular planar screened portion 27. Annular planar screened portion 27 extends substantially all the way from the sidewall 15 to a sloped, foraminous portion 26 which extends to central portion 23.

Central portion 23 includes a series of legs 28 separated by openings 25. Above legs 28 is a solid annular member 33 which extends to a thimble-shaped cap 35. The annular member 33 slopes downwardly toward an edge 36 of cap 35, creating a valley area. A plurality of legs 38 extend upwardly from edge 36 to a solid central portion of cap 35. Between legs 38 are openings 39. As described below, this cap 35 is designed to protect the water nozzle 56 (FIG. 1) and prevent a build-up of detergent on central portion 23.

Figure 4:
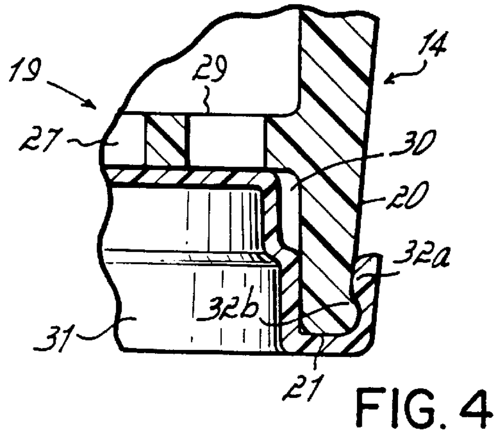
FIG. 4 is a cross-sectional view taken at lines 4—4 of FIG. 2 of the present invention.

As shown in FIG. 4, a cover 31 closes the bottom opening 30 of container 14. Cover 31 has an inner annular ridge 32*a* which engages an outer annular ridge 32*b* of lip 20 which allows the cover to snap fit over opening 30, again preventing detergent 13 from falling through the annular screen portion 27 prior to use. Cover 31 is removed prior to placing the container in dispensing unit 12.

Figure 3:
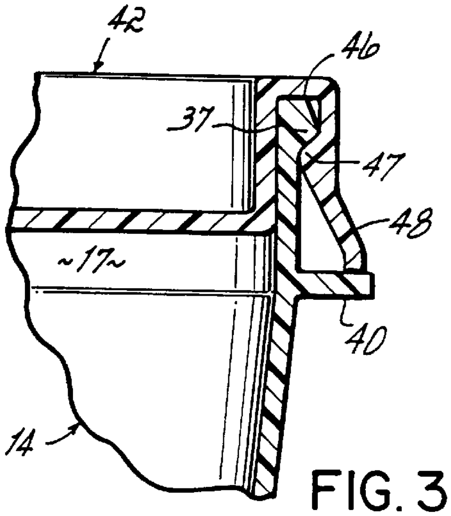
FIG. 3 is an enlarged, cross-sectional view of the top of the container with a cover of the present invention.

The top 17 of container 14 has a peripheral annular ridge 37 and immediately beneath this, along sidewall 15, is an annular rim 40, as depicted in FIGS. 1 and 3. Lid 42 covers the top 17. The lid has a round central planar portion 44 and an annular channel 46. Annular channel 46 also includes an inwardly-extended annular lip 47 designed to engage the annular ridge 37. Beneath the channel 46 is an exterior skirt 48.

Figure 2:
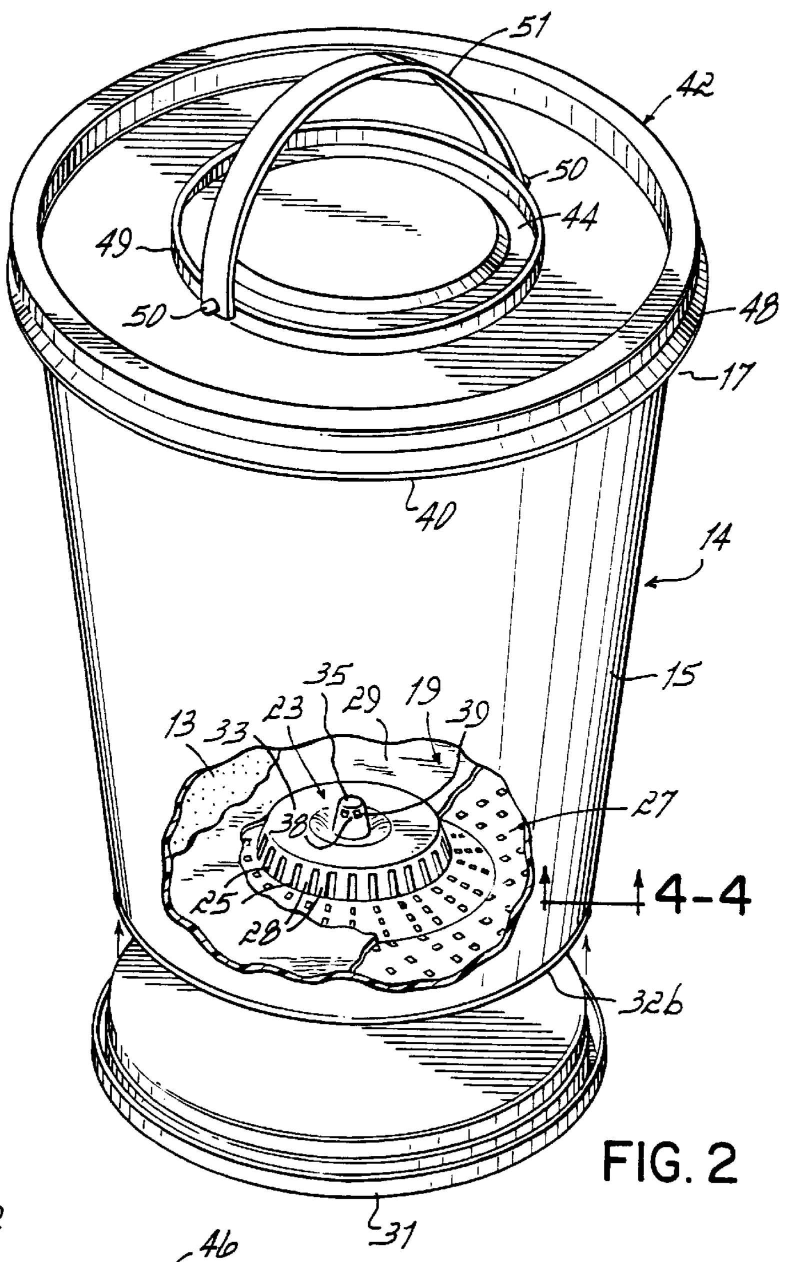
FIG. 2 is a perspective view of the container of the present invention.

An inner ring 49 extends up from planar portion 44 and includes opposed prongs 50. As shown in FIG. 2, handle 51 is attached to these prongs. Handle 51 which rotates up from the lid 42 makes it easy to carry the container 14.

Figure 5:
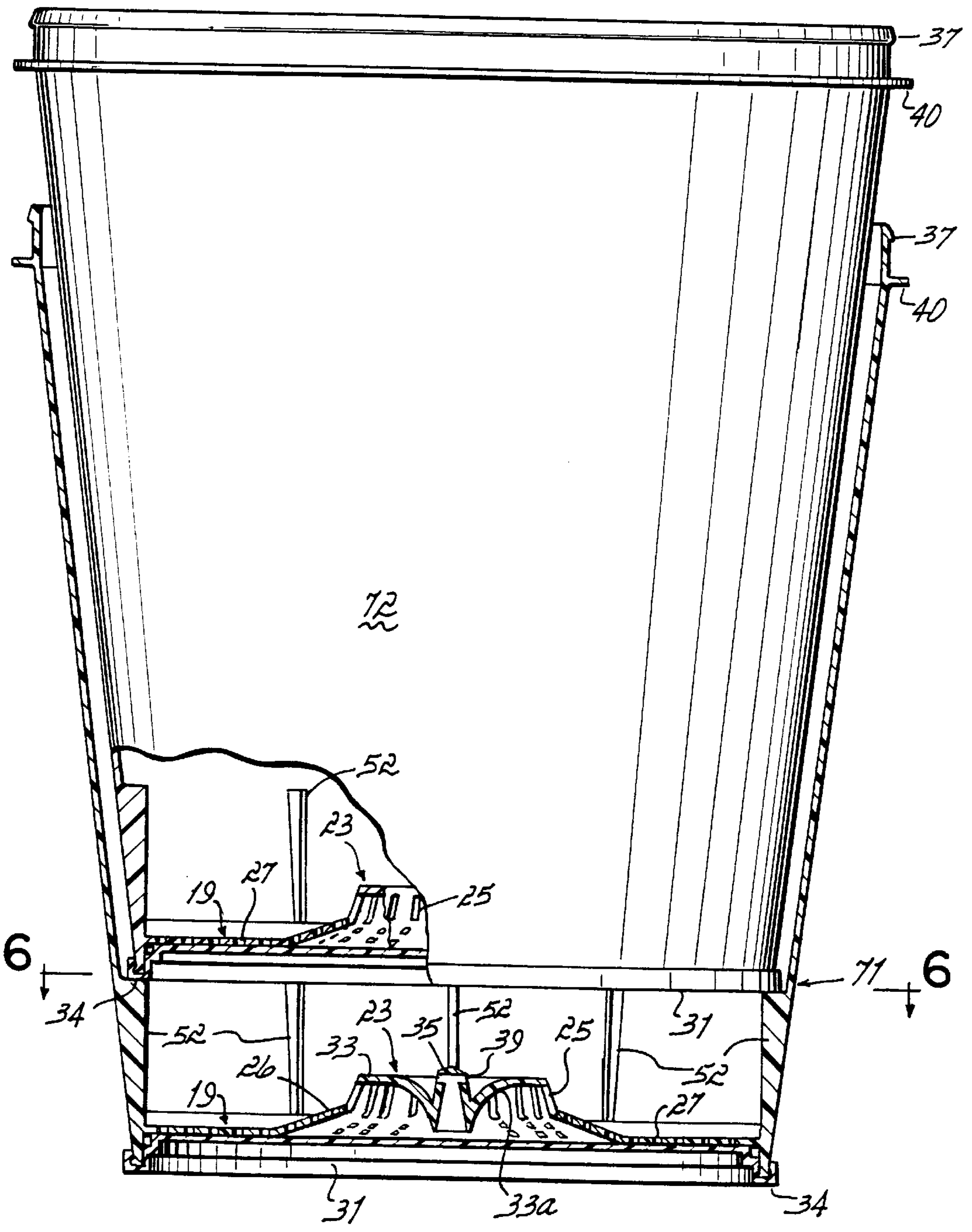
FIG. 5 is a cross-sectional view of a plurality of nested containers.

The interior walls of sidewall 15 contain legs 52 which facilitate nesting of the empty containers prior to filling. As shown in FIG. 5, containers 71 and 72 are nested together with the rim of cover 31 resting on legs 52.

To manufacture the containers 14, the body portion is injection molded together with the integral screened portion. The cover 31 is then separately injection molded along with lid 42. The cover 31 is snap fitted over opening 30 and these are stacked together for shipping, as shown in FIG. 5. The individual lids 42 would be stacked together and shipped separately.

A layer of water soluble rice paper 29 (FIG. 1) can be placed over screened portion 27 and the container 14 is filled with detergent by pouring the detergent into the open top 17. Due to the tapered configuration of sidewall 15, it is very easy to substantially fill the entire container leaving no significant void areas. The lid 42 is then snap fitted onto the open top 17 with the inward annular ridge 47 of the channel 46 engaging the annular lip 37 at rim 40. The skirt 48 is about equal in diameter to rim 40 which makes it difficult to inadvertently pull the lid 42 from the container. This is then ready for shipment to a customer's facility and insertion into a dispensing unit.

A preferred dispensing unit 12 includes a vertical sidewall 54 and a sloped frustoconical portion 55. A central water jet 56 is positioned to spray water against the central portion 23. Below the water jet 56 is a centrally-located drain 57. This unit 12 can be mounted to a wall 61 by a support plate 60 which in turn is fixed to the vertical sidewall 54 of the dispensing unit 12.

In use, as shown in FIG. 2, the bottom cap 31 is removed from the container 14 of detergent 13 and the container 14 simply placed into the dispensing unit 12. The rim 40 of the container 14, being approximately equal to the diameter of the sidewall 54 of the dispensing unit 12, tends to center the container 14 within the dispensing unit 12. The diameter of edge 21, in turn, positions the container 14 directly above the water jet. Thus, the cap of central portion 23 of the container 14 is located directly above the water jet 56 which projects a 360-degree full cone spray. The lid 65 of unit 12 is closed.

Water, shown as arrows 58, is then sprayed upwardly against central portion 23. The water passes through openings 25, dissolving detergent. This detergent solution will in turn dissolve the rice paper which will allow detergent solution to fall through the annular screened portion 27. This solution flows through drain 57 where it is directed to a washing unit not shown. A sloped portion 33*a* of solid annular member 33 assists in directing water through openings 25. By controlling the water spray, the amount of detergent dispensed is likewise controlled.

A portion of the water (represented by arrows 58*a*) passes through openings 39 in cap 35 and passes over the solid annular member 33. This dissolves detergent resting on solid annular portion 33, preventing a build-up of detergent in this area. The solid central portion 33 of cap 35 prevents detergent from falling directly on the nozzle 56 which, in turn, prevents the nozzle from clogging up.

Due to the shape of this unit, substantially all of the detergent will be utilized. The straight side walls 15 of the container which do not have any shoulders will allow detergent to freely flow downwardly as the detergent beneath it is dissolved. This will prevent forming a cake of detergent.

The design of the central portion 23 facilitates dissolving detergent resting on the screened member 27, as well as the solid central member 33. The cap 35, in turn, ensures that detergent resting on the annular solid member 33 is dissolved and generally forced to flow to the screened member 27. Further, this inhibits dissolved detergent, as well as undissolved detergent falling on nozzle 56.

This dual opening container of the present invention facilitates easy molding of the container, filling of the container, and utilization of the detergent within the container. It is simple to manufacture, simple to use, and particularly safe.

This has been a description of the present invention, along with the preferred method of use of the present invention. However, the invention itself should be defined only by the appended claims wherein we claim:

What is claimed is:

1. A detergent container with integral dispensing opening comprising a linear tapered rigid sidewall extending from a top rim to a bottom rim, wherein said top rim is larger than said bottom rim;

said integral dispensing opening comprising:

a screened bottom portion fixed to said sidewall adjacent said bottom rim;

a removable cover fixed to said top rim;

a removable bottom cover fixed to said bottom rim wherein said screened portion includes a water inlet adapted to permit water to be sprayed upwardly through said screened portion and into the detergent container to dissolve detergent resting on said screened portion and to allow dissolved detergent to thereby flow through said screened portion when said bottom cover is removed wherein the screened bottom portion comprises a sloped portion that extends to a central portion thereof.

2. The container claimed in claim 1 wherein said screened portion is molded to said sidewall.

3. The container claimed in claim 2 wherein said top cover includes an integral handle.

4. The container claimed in claim 1 wherein said bottom cover is snap fitted to said bottom rim.

5. A container holding detergent comprising a rigid, straight, inwardly tapered sidewall;

said container having a first opening at a first end of said sidewall;

a second opening at a second end of said sidewall, said second opening smaller than said first opening;

said second opening having a screened portion extending directly to said sidewall, said screened portion having a central generally horizontal inner water inlet and a central generally horizontal outer water inlet;

said second opening totally covered by a manually-removable closure;

said first opening covered by a lid snap fitted over said opening;

wherein said container holds detergent within said sidewall between said screened portion and said lid.

6. The container claimed in claim 5 wherein said removable closure is snap fitted to said sidewall.

7. The container claimed in claim 5 wherein said screened portion is molded as part of said sidewall.

8. The container claimed in claim 5 wherein said sidewalls extend below said screened portion.

9. A detergent dispensing system comprising a dispenser housing having a top, a circular sidewall, a sloped bottom wall, a drain at the bottom of said bottom wall, and a central water spray;

a container having a sloped circular sidewall, an integral bottom screened portion, a removable top cover, a round top edge, and a round bottom edge wherein said bottom edge is smaller than said top edge;

said bottom edge of said container resting on the sloped bottom wall of said housing with the top edge of said container mating with a top portion of said housing to provide alignment of said bottom screen over said water spray;

wherein said screened portion has a central generally horizontal inner water inlet and a central generally horizontal outer water inlet aligned with said water spray.

10. The housing claimed in claim 9 wherein said housing includes a lid which, when closed, is immediately adjacent the top of said housing.

* * * * *